United States Patent
Hung et al.

(10) Patent No.: US 12,551,522 B2
(45) Date of Patent: Feb. 17, 2026

(54) HERBAL COMPOSITIONS AND METHODS FOR TREATING AND PREVENTING SARS-CoV-2 VIRUS INFECTION

(71) Applicant: CHINA MEDICAL UNIVERSITY, Taichung (TW)

(72) Inventors: Mien-Chie Hung, Taichung (TW); Long-Bin Jeng, Taichung (TW); Sheng-Teng Huang, Taichung (TW); Wei-Jan Wang, Taichung (TW); Hsiao-Fan Chen, Taichung (TW); Wei-Te Huang, Taichung (TW); Shi-Chen Ou, Taichung (TW)

(73) Assignee: China Medical University, Taichung (TW)

( * ) Notice: Subject to any disclaimer, the term of this patent is extended or adjusted under 35 U.S.C. 154(b) by 572 days.

(21) Appl. No.: 18/053,767

(22) Filed: Nov. 9, 2022

(65) Prior Publication Data
US 2023/0149492 A1     May 18, 2023

Related U.S. Application Data

(60) Provisional application No. 63/278,500, filed on Nov. 12, 2021.

(51) Int. Cl.
| | |
|---|---|
| *A61K 36/481* | (2006.01) |
| *A61K 36/11* | (2006.01) |
| *A61K 36/23* | (2006.01) |
| *A61K 36/238* | (2006.01) |
| *A61K 36/284* | (2006.01) |
| *A61K 36/355* | (2006.01) |
| *A61K 36/53* | (2006.01) |
| *A61P 31/14* | (2006.01) |

(52) U.S. Cl.
CPC ............ *A61K 36/481* (2013.01); *A61K 36/11* (2013.01); *A61K 36/23* (2013.01); *A61K 36/238* (2013.01); *A61K 36/284* (2013.01); *A61K 36/355* (2013.01); *A61K 36/53* (2013.01); *A61P 31/14* (2018.01)

(58) Field of Classification Search
None
See application file for complete search history.

(56) References Cited

PUBLICATIONS

Sha Li et. al. (Edible and Herbal Plants for the prevention and Management of COVID-19, Frontiers in Pharmacology, 12, 656103, Apr. 28, 2021) (Year: 2021).*
Yujiao Zheng et. al. (Understanding COVID-19 in Wuhan From the Perspective of Cold-Dampness: Clinical Evidences and Mechanisms, Frontiers in Medicine, vol. 8, article 617659, Feb. 22, 2021) (Year: 2021).*

* cited by examiner

*Primary Examiner* — Terry A Mckelvey
*Assistant Examiner* — Jacob A Boeckelman
(74) *Attorney, Agent, or Firm* — Hannah Tien

(57) ABSTRACT

This invention discloses a herbal composition for treating or preventing severe acute respiratory syndrome coronavirus 2 (SARS-CoV-2), including the wild type and its different variant strains. The composition comprises the extract of *Platycodon grandiflorum*, which showed the synergistic inhibitory effect of infection compared to the Anti-epidemic No. 1 (AN1) consisted of *Astragalus membranaceus, Atractylodes macrocephala, Saposhnikovia divaricata, Atractylodes lancea, Pogostemon cablin, Glehnia littoralis, Lonicera japonica* and *Cyrtomium fortunei*.

12 Claims, 16 Drawing Sheets

HERBAL COMPOSITIONS AND METHODS FOR TREATING AND PREVENTING SARS-CoV-2 VIRUS INFECTION

This application claims the benefit of U.S. Provisional Patent Application No. 63/278,500 filed on Nov. 12, 2021, which is incorporated by reference herein in its entirety.

FIELD OF THE INVENTION

The present invention discloses a herbal medicine of Kang Guan Receipt, Anti-epidemic No. 1 (AN1) and Anti-epidemic No. 2 (AN2) applied to the treatment and prevention of diseases or disorders caused by wild-type and mutant SARS-CoV-2 virus infections through reducing the virus infection.

BACKGROUND OF THE INVENTION

Coronavirus disease 2019 (COVID-19) is known as infected by the novel severe acute respiratory syndrome coronavirus 2 (SARS-CoV-2). Although two mRNA vaccines have been approved, the newly identified mutations N501Y from United Kingdom (UK) and E484K from South Africa of SARS-CoV-2 and other mutations could still hinder the efficacy of these vaccines. Therefore, it is of high urgency to develop safe and effective drugs that effectively and directly block interactions between viral spike glycoprotein and ACE2 on the host.

Currently, there are nearly 100 million people infected with COVID-19 in the world. What is more serious is that more than 3 million people have died and the current trend of pandemic is still not improved. Furthermore, the virus has been mutated, which affect the effectiveness and development of the vaccine. In addition, almost all small molecule drugs have poor efficacy in the clinical trials, such as the early quinine at that time. Therefore, there is still an urgent need to develop various alternative drugs to treat and prevent the infection. Herbal composition can be one of the options.

SUMMARY OF THE INVENTION

In view of the above technical circumstances, the present invention provides a herbal composition of Kang Guan Receipt, comprising the Anti-epidemic No. 1 (AN1) formula and *Platycodon grandiflorum* extract applied to the treatment and prevention of wild-type and mutant SARS-CoV-2 virus infections, preparations thereof, and a method for preparing the same.

The Anti-epidemic No. 1 (AN1) formula, a herbal composition for treating or preventing severe acute respiratory syndrome coronavirus 2 (SARS-CoV-2), the composition made from raw materials consisting of: 12-18 parts by weight of extract of *Astragalus membranaceus*; 12-18 parts by weight of extract of *Atractylodes macrocephala*; 12-18 parts by weight of extract of *Saposhnikovia divaricata*; 6-12 parts by weight of extract of *Atractylodes lancea*; 12-18 parts by weight of extract of *Pogostemon cablin*; 12-18 parts by weight of extract of *Glehnia littoralis*; 12-18 parts by weight of extract of *Lonicera japonica*; and 6-12 parts by weight of extract of *Cyrtomium fortunei*.

The present invention also provides a Kang Guan Receipt, a herbal composition for treating or preventing severe acute respiratory syndrome coronavirus 2 (SARS-CoV-2), the composition made from raw materials consisting of: 15-25 parts by weight of extract of *Astragalus membranaceus*; 15-25 parts by weight of extract of *Atractylodes macrocephala*; 15-25 parts by weight of extract of *Saposhnikovia divaricata*; 9-15 parts by weight of extract of *Atractylodes lancea*; 15-25 parts by weight of extract of *Pogostemon cablin*; 15-25 parts by weight of extract of *Glehnia littoralis*; 15-25 parts by weight of extract of *Lonicera japonica*; 9-15 parts by weight of extract of *Cyrtomium fortunei* and 30-60 parts by weight of extract of *Platycodon grandiflorum*.

The present invention further provides an Anti-epidemic No. 2 (AN2) formula, Chinese medicine composition for treating or preventing severe acute respiratory syndrome coronavirus 2 (SARS-CoV-2), the composition made from raw materials consisting of: 10-20 parts by weight of extract of *Houttuynia cordata*; 3-9 parts by weight of extract of *Chrysanthemum grandiflorum*; 10-20 parts by weight of extract of *Artemisia capillaris*; 5-15 parts by weight of extract of *Eupatorium fortunei*; 10-20 parts by weight of extract of *Taraxacum formosanum*; 3-9 parts by weight of extract of *Lonicera japonica*; 5-15 parts by weight of extract of *Pueraria montana*; 3-9 parts by weight of extract of *Perilla frutescens*; and 5-15 parts by weight of extract of *Pogostemon cablin*.

The present invention provides a method of treating or preventing severe acute respiratory syndrome coronavirus 2 (SARS-CoV-2) of the Kang Guan Receipt, wherein the SARS-CoV-2 comprise wild type and its variants of Alpha, Beta, Gamma, Delta and Omicron strain.

The present invention also provides a method of treating or preventing severe acute respiratory syndrome coronavirus 2 (SARS-CoV-2) of the Anti-epidemic No. 1 (AN1) formula, wherein the SARS-CoV-2 comprise wild type and its variants of Alpha, Beta, Gamma, Delta and Omicron strain.

DETAILED DESCRIPTION OF THE INVENTION

As used herein, "a," "an," "the," "at least one," and "one or more" are used interchangeably.

In one embodiment, the *Platycodon grandiflorum* showed the abilities to suppress the infection of the SARS-CoV-2 virus.

Extracts of different herbal medicine are evaluated for their anti-viral effect, including *Lonicera* and *Forsythia* Powder (A1), Jade Wind-Barrier Powder (A13), *Platycodon grandiflorum* (B18), *Nervilia aragoana* Commons ex Gaudich (C33), *Euonymus rostratus* W. W. Sm. (C35), *Justicia procumbens* Linn. (C47), *Peristrophe baphica* (C49), *Tridax procumbens* Linn. (C52), *Xanthium strumarium* L. (C53), *Pteris multifida* Poir (C60), *Urena lobata* L. (C63). Among these extracts, almost all extracts effectively inhibit the binding of spike protein to ACE2 of SARS-CoV-2 virus and, *Platycodon grandiflorum* in particular.

In one embodiment, the compositions of Anti-epidemic No. 1 (AN1) formula and Anti-epidemic No. 2 (AN2) show the inhibitory effects on the infection rate of different variants of the SARS-CoV-2 virus including the wild type and the B.1.1.7 variant (British variant strain).

The compositions of Anti-epidemic No. 1 (AN1) and Anti-epidemic No. 2 (AN2) show the dose response effect on the suppression of the infection rate on the wild type and the B.1.1.7 variant (British variant strain).

In one embodiment, the composition of Anti-epidemic No. 1 (AN1) with addition of *Platycodon grandiflorum* showed the inhibitory effects on the infection rate of the wild type and the B.1.1.7 variant of SARS-CoV-2 virus.

*Platycodon grandiflorum* extract and *Fritillaria thunbergia* extract were added to the composition of Anti-epidemic No. 1 (AN1) and are further evaluated their anti-viral ability. The groups of *Platycodon grandiflorum* extract addition exhibits the synergistically inhibitory effect on the infection of both wild type and B.1.1.7 variant of SARS-CoV-2 virus. In the present invention, the novel combination is called Kang Guan Recipe.

In one embodiment, both the compositions of Anti-epidemic No. 1 (AN1) and Kang Guan Receipt show the inhibitory effects on the infection rate of different variant strain such as Alpha, Beta, Gamma, Delta and Omicron strains. In particular, these variants are the B.1.1.7 British variant strain, the 501Y.V2 South African variant strain, the B.1.618 India variant strain, the B.1.617.2 India Delta variant strain or Omicron variant including BA.4/BA.5.

Figure 7:
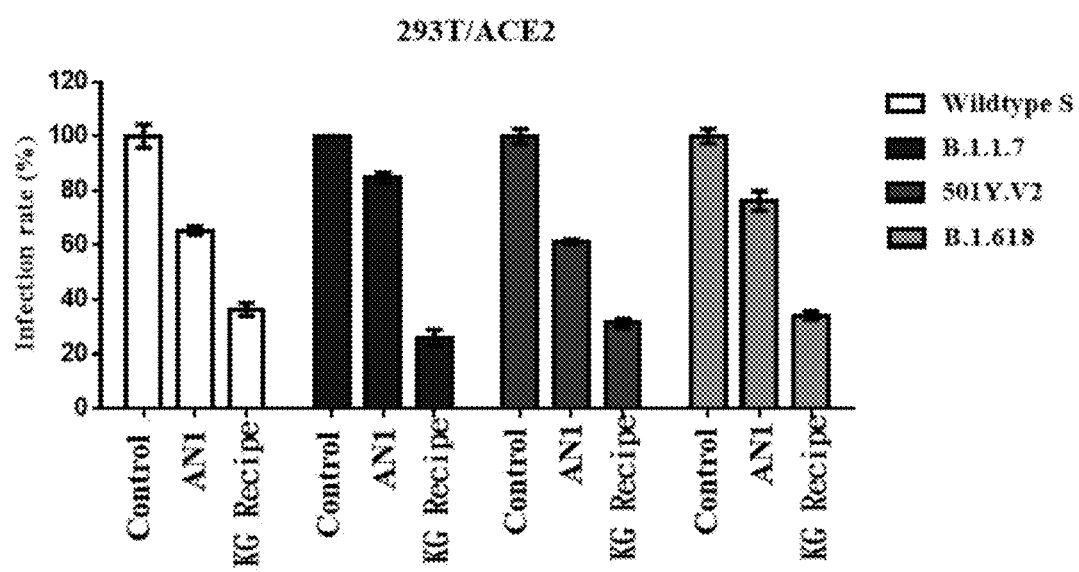
FIG. 7 illustrates Kang Guan Recipe having better efficacy on inhibition of variants of concern infection.

The composition of Kang Guan Receipt is tested for the anti-viral ability among the B.1.1.7 variant, 501Y.V2 variant and B.1.618 variant strains. The obvious synergistically inhibitory effect is shown in FIG. 7.

Figure 5:
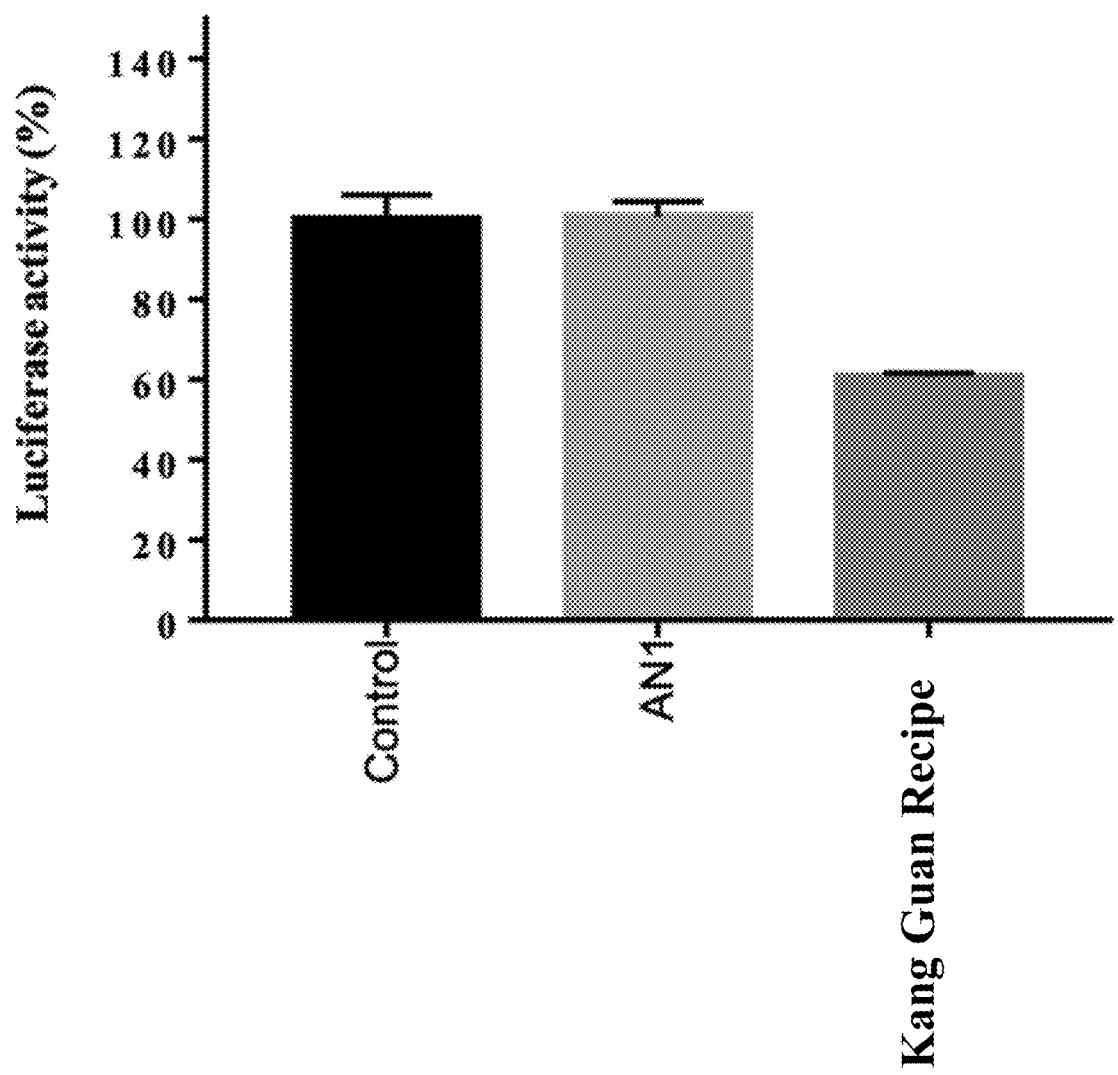
FIG. 5 illustrates the effects of the Anti-epidemic No. 1 (AN1) and Kang Guan recipe on the infectivity of B.1.617.2 India Delta variant strain.

The novel composition of Kang Guan Receipt exhibits anti-infective activity on the B.1.617.2 India Delta variant strain, as shown in FIG. 5.

The herbal composition of the present invention could be formulated as a gel, an ointment, a cream, a film coating agent, a lotion, a liniment, an aerosol, a spray, a plaster, a tablet, a pill, a capsule, or a dropping pill.

EXAMPLE

The examples below are non-limited and are merely representative of various aspects and features of the present invention.

Figure 1:
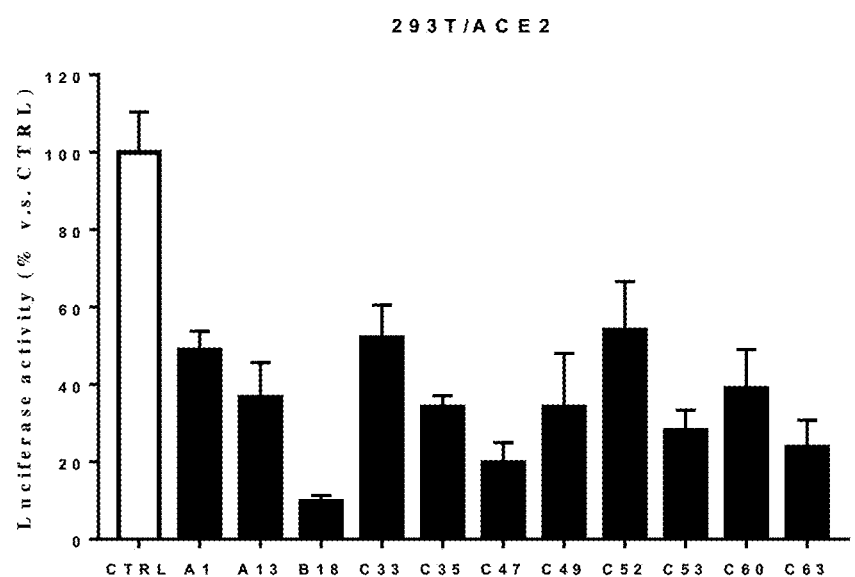
FIG. 1 illustrates fluorescence resonance energy transfer (FFRET) assay of different herbal medicines.

Example 1: Fluorescence Resonance Energy Transfer (FFRET) Assay of Selection Interruption of the SARS-CoV-2 spike S1 and human ACE2 interaction by AN1 or Kang Guan Recipe (KG Recipe) was detected using the TR-FRET assay according to the manufacturer's protocol (Catalog #79949-1, BPS Bioscience, Inc.) from Wang's method. Briefly, ACE2 and Spike S1 proteins with or without AN1 or KG Recipe) in 1 mg and 3 mg were incubated at room temperature for 1 hour. TR-FRET signals were read at 665 nm. To screen the antiviral effect of herbal medicines, we first added different Chinese herbs (100× dilution) to the cells and put them into the incubator for 1 h, and then we added wild type (MOI˜0.2) pseudoviral vectors to 293T cells expressing human ACE2, and centrifuge 1200×g for 30 min before returning to the incubator. After 24 hours, 100 µl of cold light reagent (Bright-glo Luciferase Assay System, Promega, USA) was added to each group, after which the cold light is detected by ELISA plate. Cell survival was determined by the Cell Counting Kit-8 (CCK-8) assay. The lower the activity value, the better the ability to inhibit viral infection. In this experiment, the control value is set to 100%, and the values of the remaining group were compared to the value of the control group. The results of FIG. 1 showed that B18 has the best effect on inhibiting viral infection. In the represent numbers in FIG. 1, CTRL is control group, A1 is *Lonicera* and *Forsythia* Powder, A13 is Jade Wind-Barrier Powder, B18 is *Platycodon grandiflorum*, C33 is *Nervilia aragoana* Commons ex Gaudich, C35 is *Euonymus rostratus* W. W. Sm., C47 is *Justicia procumbens* Linn., C49 is *Peristrophe baphica*, C52 is *Tridax procumbens* Linn., C53 is *Xanthium strumarium* L., C60 is *Pteris multifida* Poir, C63 is *Urena lobata* L.

Figure 2:
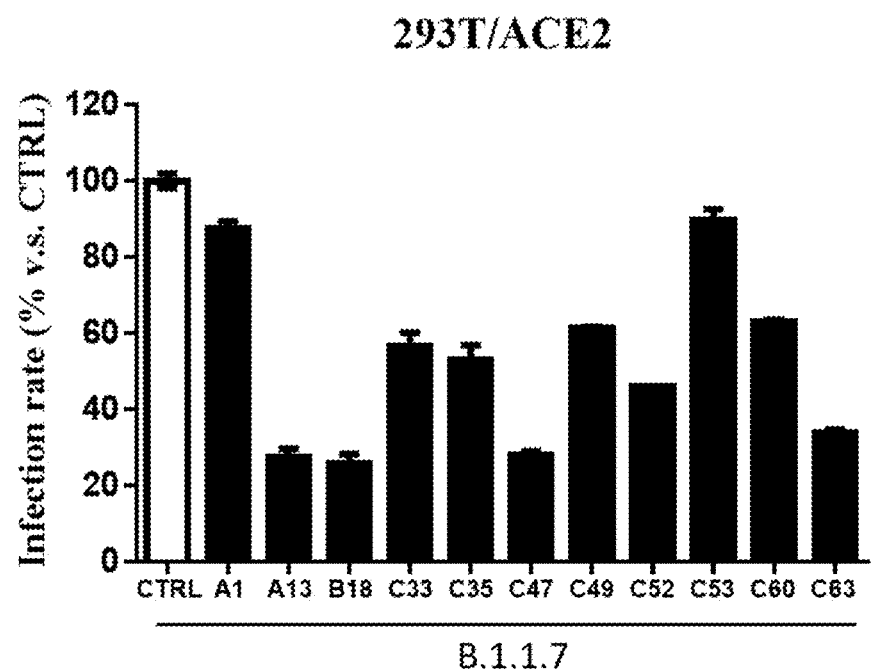
FIG. 2 illustrates herbal medicines of lentiviral particles pseudotype (Vpp) with SARS-CoV-2 spike protein infection assay
Figure 3A:
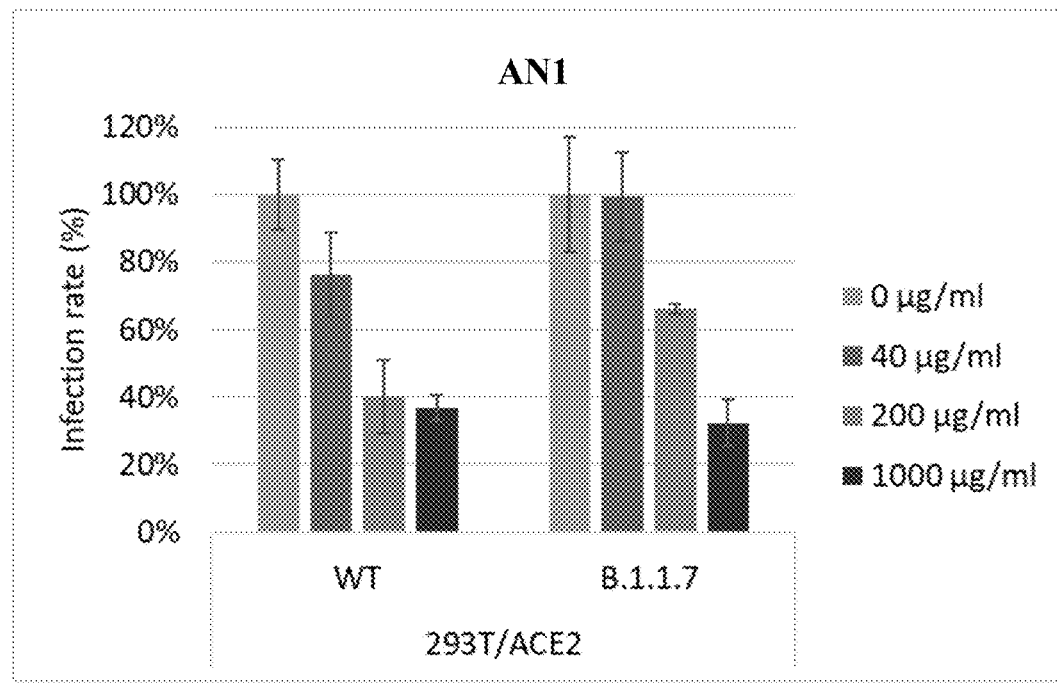
FIG. 3A illustrates the inhibitory effects on the infection rate of different variants of the SARS-CoV-2 virus with the Anti-epidemic No. 1 (AN1).
Figure 3B:
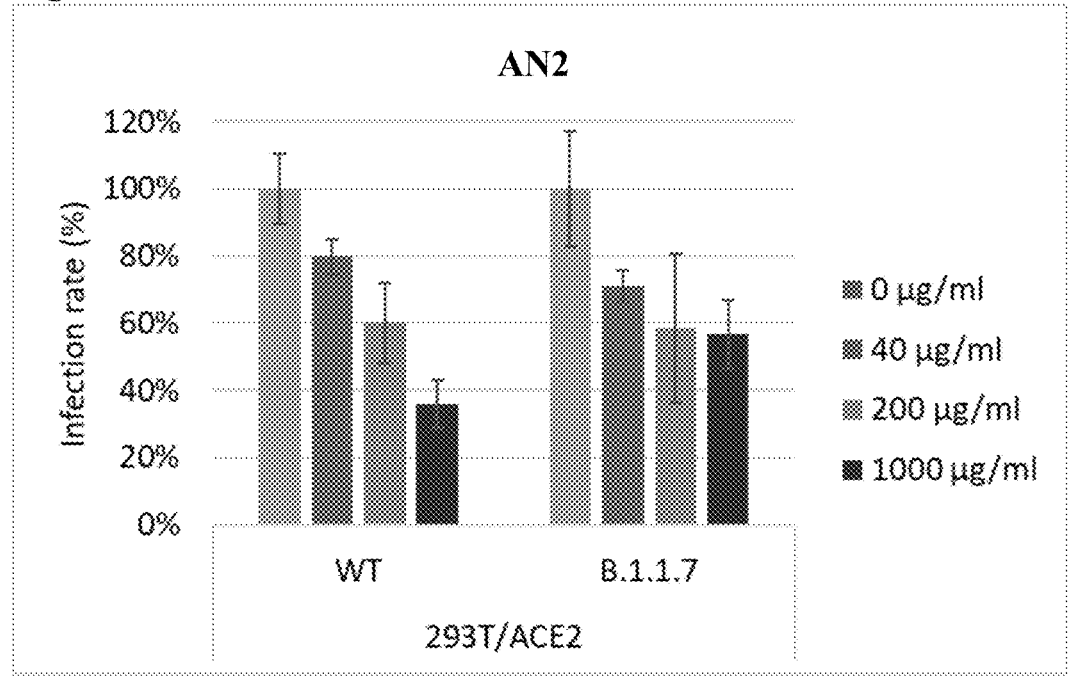
FIG. 3B illustrates the inhibitory effects on the infection rate of different variants of the SARS-CoV-2 virus with the Anti-epidemic No. 2 (AN2). The wild type (WT) of coronavirus is prototype strain and the B.1.1.7 variant is British variant strain.
Figure 4:
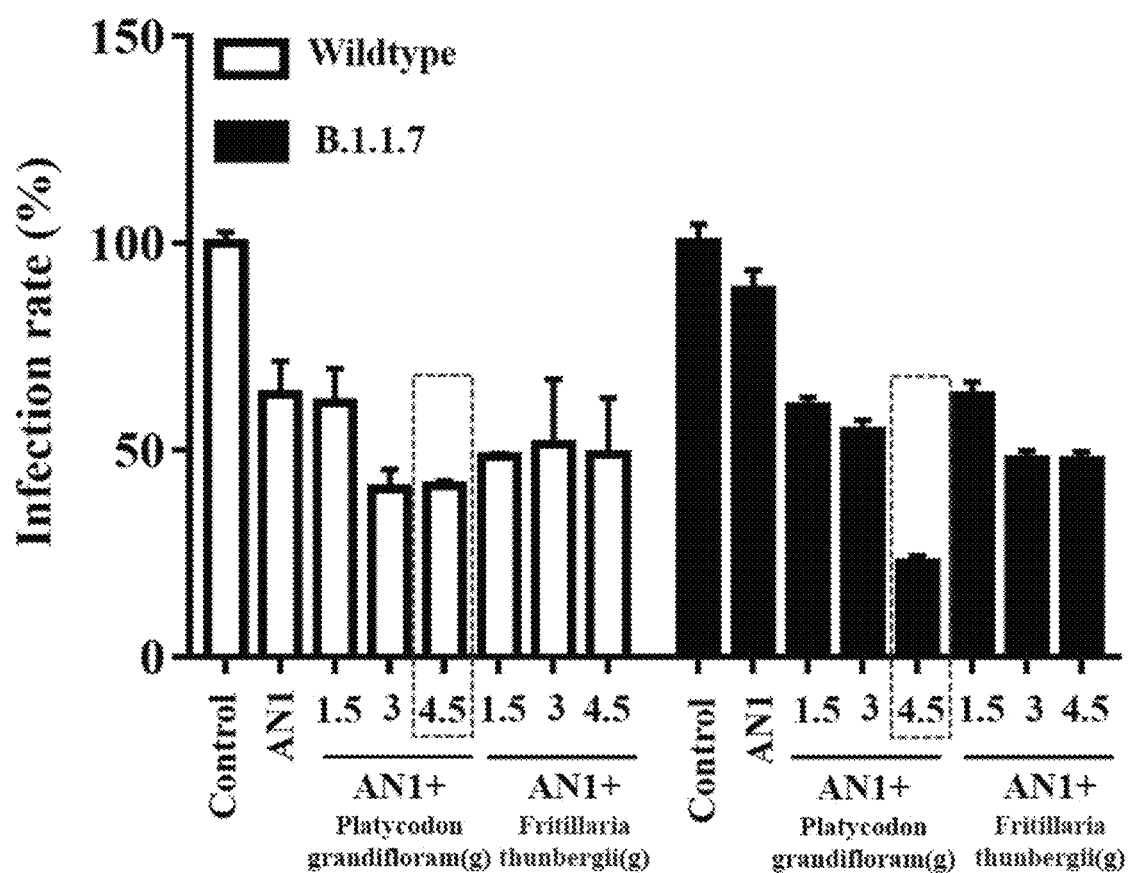
FIG. 4 illustrates the inhibitory effects of Anti-epidemic No. 1 (AN1) with addition of *Platycodon grandiflorum* extract and *Fritillaria thunbergia* extract on the infection rate.

Example 2: Lentiviral Particles Pseudotype (Vpp) with SARS-CoV-2 Spike Protein Infection Assay Vpp contains SARS-CoV-2 spike protein and a luciferase reporter SARS-CoV-2, Alpha, Beta, Gamma, Delta and Omicron variants were purchased from the National RNAi Core Facility (NRC), Academia Sinica, Taipei, Taiwan. Then, Vpp was added to the cells in a 96-well plate (MOI˜0.2) in the presence of polybrene (8 µg/mL). The plate was centrifuged at 1,200 µg for 30 min and then returned to the incubator. After twenty-four hours post-infection (hpi), the culture supernatants were replaced with fresh medium. After seventy-two hours post-infection, luciferase activity was determined according to the manufacturer's instructions. To screen the antiviral effect of herbal medicines, different Chinese herbs (100× dilution) were added to the cells and placed them in the incubator for 1 h, and then the alpha (MOI⁻0.2) pseudoviral vector was added to 293T cells expressing human ACE2, and centrifuge 1200×g for 30 min before returning to the incubator. After 24 hours, 100 µl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control group is set to 100%, and values of the remaining group were compared to the value of the control group. In FIG. 2, it could be found that A13 and B18 has the best effect on inhibiting viral infection.

Example 3: Preparation of *Platycodon grandiflorum* Extract, AN1 Formula, AN2 Formula and Kang Guan Recipe

*Platycodon grandiflorum* extract: 37.5 g *Platycodon grandiflorum* was dissolved and immersed in 300 cc water for 30 min, boiled and collected to 50 cc solution. The solution was cold down at room temperature and filtered by 0.22 um filter to obtain the extract.

AN1 formula: 2 g *Astragalus membranaceus*, 2 g *Atractylodes macrocephala*, 2 g *Saposhnikovia divaricata*, 1.2 g *Atractylodes lancea*, 2 g *Pogostemon cablin*, 2 g *Glehnia littoralis*, 2 g *Lonicera japonica*, 1.2 g *Cyrtomium fortune* (14.4 g) were dissolved and immersed in 300 cc water for 30 min, boiled and collected to 50 cc solution. The solution was cold down at room temperature and filtered by 0.22 um filter to obtain the AN1 formula.

AN2 formula: 3 g *Houttuynia cordata* Thunb, 1.2 g *Chrysanthemum*, 3 g *Artemisia capillaris* Thunb, 2 g *Eupatorium fortunei*, 3 g Dandelion, 1.2 g *Lonicera japonica*, 2 g *Puerariae Lobatae Radix*, 1.2 g *Perillae Folium*, 2 g *Pogostemon cablin* (18.6 g) were dissolved and immersed in 300 cc water for 30 min, boiled and collected to 50 cc solution. The solution was cold down at room temperature and filtered by 0.22 um filter to obtain the AN2 formula.

Kang Guan Recipe: 2 g *Astragalus membranaceus*, 2 g *Atractylodes macrocephala*, 2 g *Saposhnikovia divaricata*, 1.2 g *Atractylodes lancea*, 2 g *Pogostemon cablin*, 2 g *Glehnia littoralis*, 2 g *Lonicera japonica*, 1.2 g *Cyrtomium fortune*, 4.5 g *Platycodon grandiflorum* (18.9 g) were dissolved and immersed in 300 cc water for 30 min, boiled and collected to 50 cc solution. The solution was cold down at room temperature and filtered by 0.22 um filter to obtain the Kang Guan Recipe.

*Platycodon grandiflorum*.

The following table 1 showed the dosage of AN1 and AN2 formula for prevention of COVID19 infection. Both the AN1 and AN2 formula did not show the cytotoxicity.

TABLE 1

The dosage of AN1 and AN2 formula for prevention of COVID19

|  | AN1 | AN2 |
| --- | --- | --- |
| EC50 (µg/ml) |  |  |
| WT | 208.20 | 386.30 |
| B.1.1.7 | 450.20 | 2893.00 |
| CC50 (µg/ml) |  |  |

TABLE 1-continued

The dosage of AN1 and AN2 formula for prevention of COVID19

|  | AN1 | AN2 |
| --- | --- | --- |
| WT | 9551.00 | 44960.00 |
| B.1.1.7 | 9551.00 | 44960.00 |
| Selective Index (CC50/EC50) |  |  |
| WT | 45.87 | 116.39 |
| B.1.1.7 | 21.22 | 15.54 |

Example 4: Infection Experiments of Pseudoviral Vector

The infection efficiency of the virus was tested using pseudoviral vectors with spike proteins and cold light reporter genes. First, different herbal medicines were added to 293T cells expressing human ACE2 and placed them in the incubator for 1 h. Then, (MOI⁻0.2) pseudoviral vectors were added to the cells and centrifuged 1200×g for 30 min before returning to the incubator. After 24 hours, 100 µl of cold light reagent (Bright-glo Luciferase Assay System, Promega, USA) was added to each group, after which the cold light was detected by ELISA plate. Cell survival was determined by the Cell Counting Kit-8 (CCK-8) assay.

The statistical significance of a difference between mean values was estimated using the SigmaPlot software package for performing independent Student's t-tests. Error bars indicate the SEM of technical triplicates. The data were expressed as the means±SEM. P values of less than 0.05 were considered statistically significant. *, p value<0.05; ***, p value<0.001 compared with control.

Figure 6:
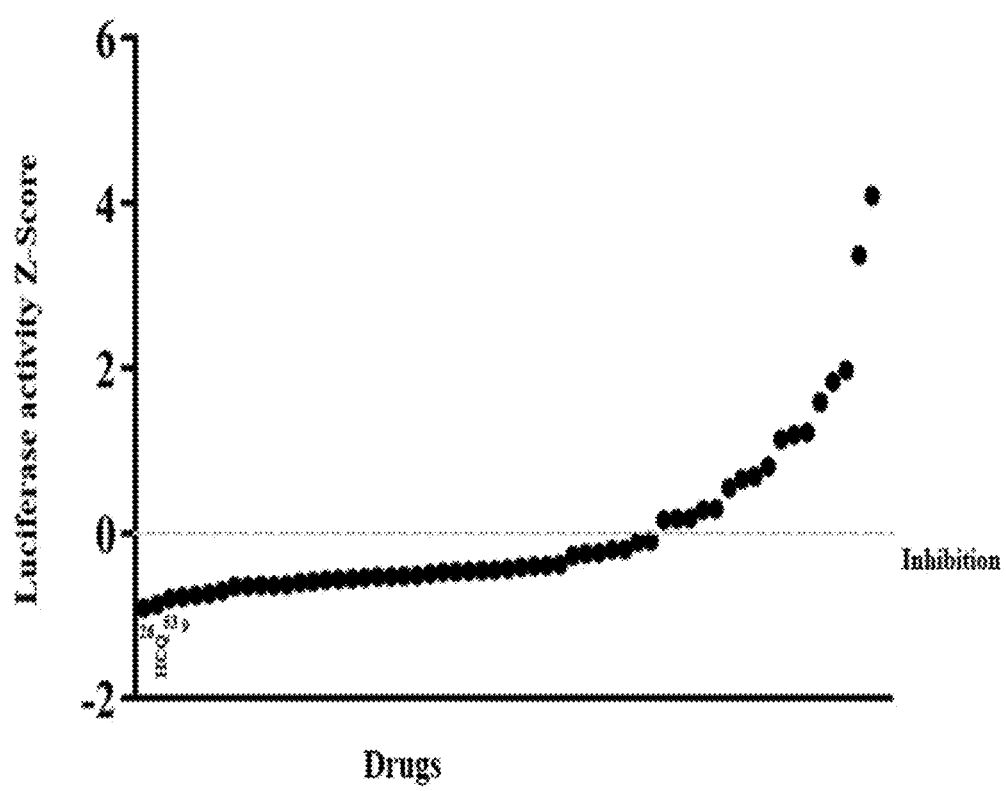
FIG. 6 illustrates Screening for Herbal medicine with potential inhibitory activity on SARS-CoV-2 pseudovirus entry.

Example 5: Screening for Herbal Medicines with Potential Inhibitory Activity on SARS-CoV-2 Pseudovirus Entry To screen the antiviral effect of herbal medicine, different Chinese herbs (100× dilution) were added to the cells and put them into the incubator for 1 h, and then wild type (MOI⁻0.2) pseudoviral vectors were added to 293T cells expressing human ACE2, and centrifuge 1200×g for 30 min before returning to the incubator. After 24 hours, 100 µl of cold light reagent (Bright-glo Luciferase Assay System, Promega, USA) was added to each group, after which the cold light is detected by ELISA plate. Cell survival was determined by the Cell Counting Kit-8 (CCK-8) assay. The lower the Z-score value, the better the ability to inhibit viral infection. The top three results in FIG. 6 could be found as A13, B18 and C47, and their Z-score were 9, 26, 53, respectively.

Example 6: Kang Guan Recipe Having Better Efficacy on Inhibition of Variants of Concern Infection To screen herbal medicines for antiviral effects, Epidemic Prevention No. 1 (AN1) or Kang Guan Recipe (3 mg/ml) was added to 293T cells expressing human ACE2 and put them into the incubator for 1 h, and then different variants of the virus wild type Alpha, beta, and Indian variant B.1.618 (MOI⁻0.2) pseudoviral vectors were added to cells and centrifuged at 1200×g for 30 min before returning to the incubator. After 24 hours, 100 µl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control group is set to 100%, and the values of the remaining group are compared to the value of the control group. The results of FIG. 7 could be found that Kang Guan Recipe (KG Recipe) have the best effect of inhibiting viral infection.

Figure 8:
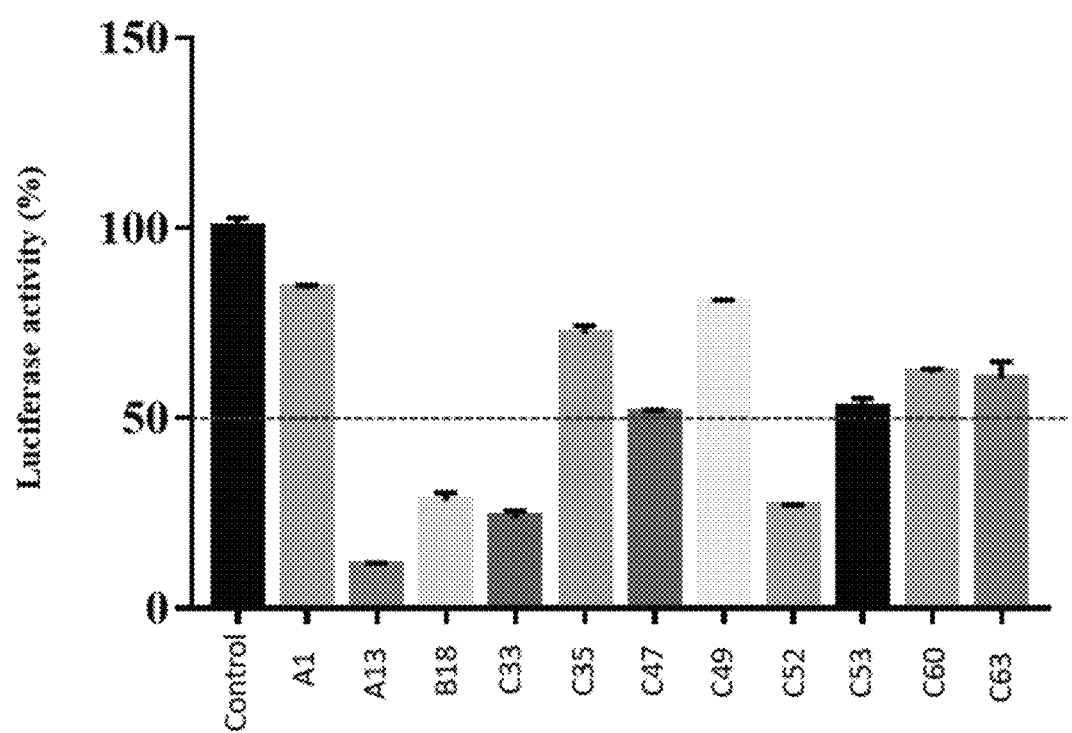
FIG. 8 illustrates the efficacy of Herbal medicine on inhibition of delta viral infection.

Example 7: The Efficacy of Herbal Medicine on Inhibition of Delta Viral Infection To screen the antiviral effect of herbal medicines, different Chinese herbs (100× dilution) were added to the cells and placed them in the incubator for 1 h, and then Delta's (MOI~0.2) pseudoviral vector was added to express human origin ACE2 in 293T cells, and centrifuge 1200×g for 30 min before returning to the incubator. After 24 hours, 100 μl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control group is set to 100%, and the values of the remaining group are compared to the value of the control group. The results of FIG. 8 could be found that A13 has the best effect of inhibiting viral infection.

Example 8: Kang Guan Recipe Inhibiting Infection of Delta Variant in A549 Cells

Figure 9:
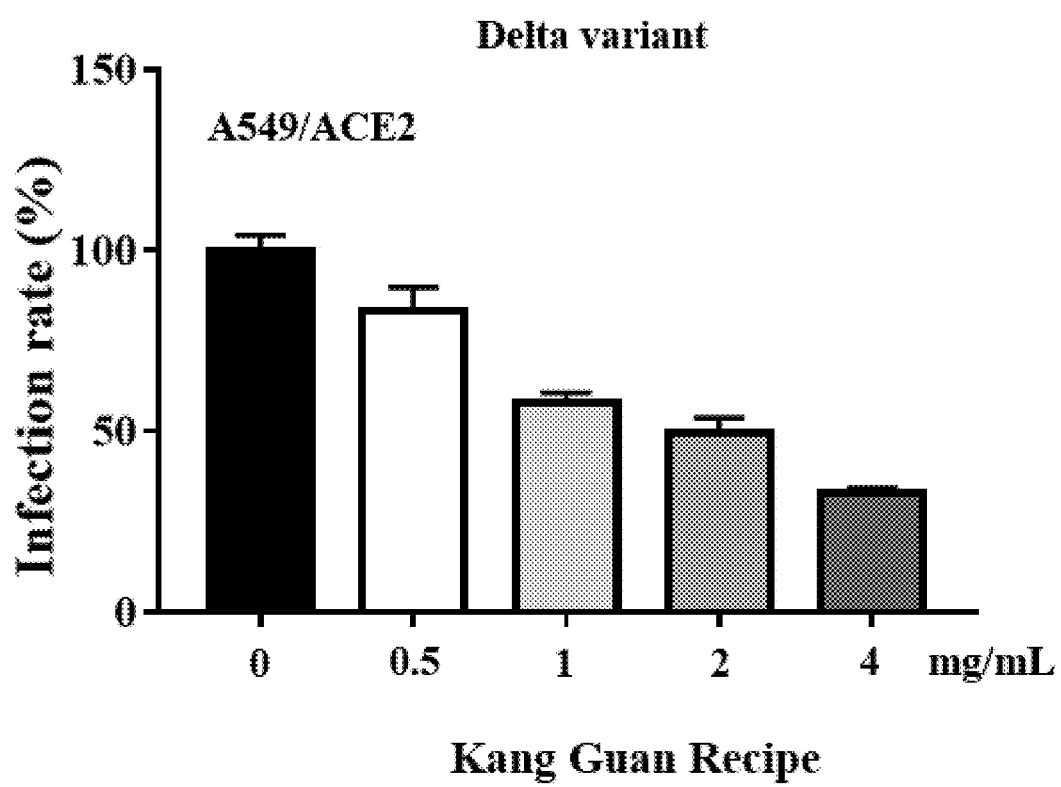
FIG. 9 illustrates Kang Guan Recipe inhibits infection from wild type and delta variant infected with A549 cells.

To screen the antiviral efficacy of herbal medicines, different concentrations of Kang Guan Recipe (0.5-4 mg/ml) were added to A549 lung cancer cells expressing human ACE2 and placed them in the incubator for 1 h, after which different variants of wild type Delta's (MOI~0.2) pseudoviral vector was added to the cells and centrifuged for 1200×g for 30 min before returning to the incubator. After 24 hours, 100 μl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control group is set to 100%, and the values of the remaining group values are compared to the value of the control group. The results of FIG. 9 could be found that Kang Guan Recipe has better inhibits viral infection along with the increase of concentration.

Example 9: Kang Guan Recipe Blocking the Interaction of Spike and ACE2 Receptor

Figure 10:
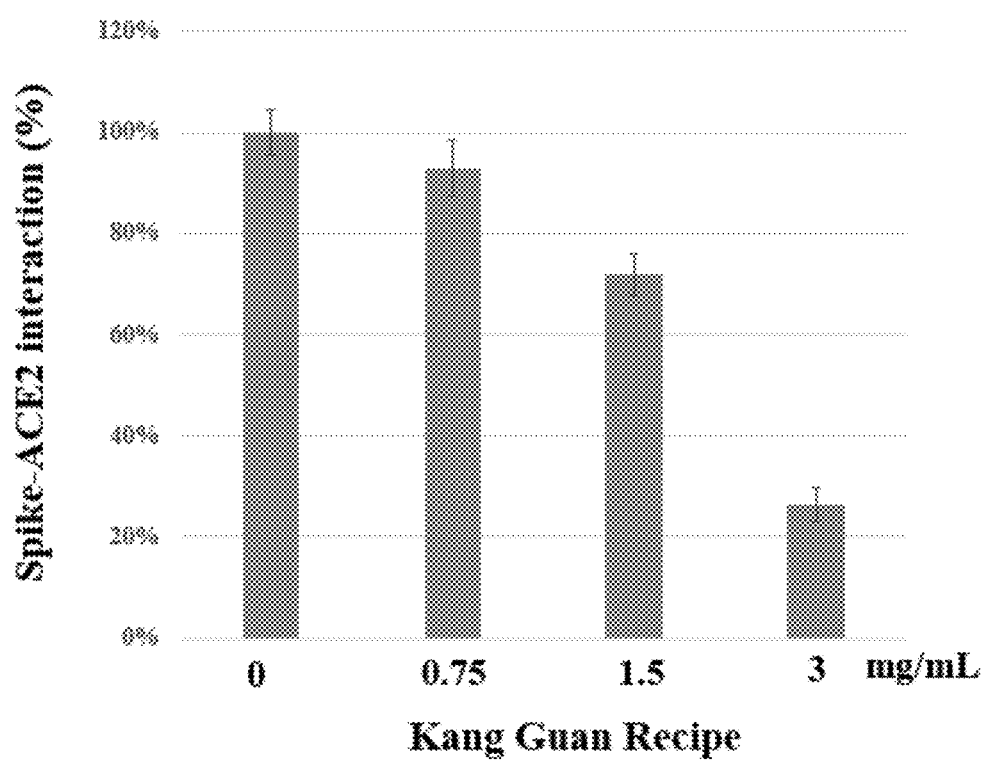
FIG. 10 illustrates Kang Guan Recipe blocks the interaction of spike and ACE2 receptor.

The interaction test of Spike protein and ACE2 was performed using SARS-CoV-2 ELISA Kit (AllBio), First, horseradish peroxidase (HRP)-binding-ACE2 was added to a dish and then different concentrations of Kang Guan Recipe (0.75-3 mg/ml) were added to the dish and incubated at room temperature for 30 minutes. The reagent containing HRP-ACE2 and Kang Guan Recipe was then added to the ELISA plate pre-containing SARS-CoV-2 spike RBD and placed in a 37° C. incubator for 1 hour. Then, the plate was washed five times with wash buffer, then 90 μl of TMB (3,3,5,5-Tetramethylbenzidine, AllBio) substrate solution was added the plate at the last wash step and place the plate in a 37° C. incubator for 20 minutes. The color was then detected by adding 50 μl of the Stop solution and the number was read by using an ELISA reader with a wavelength of 450 nm. The value of control group was set to 100% and the values of the other groups were compared with the value of the control group. FIG. 10 showed that the higher the concentration of Kang Guan Recipe, the better the ability to inhibit the binding of spike to ACE2.

Figure 11:
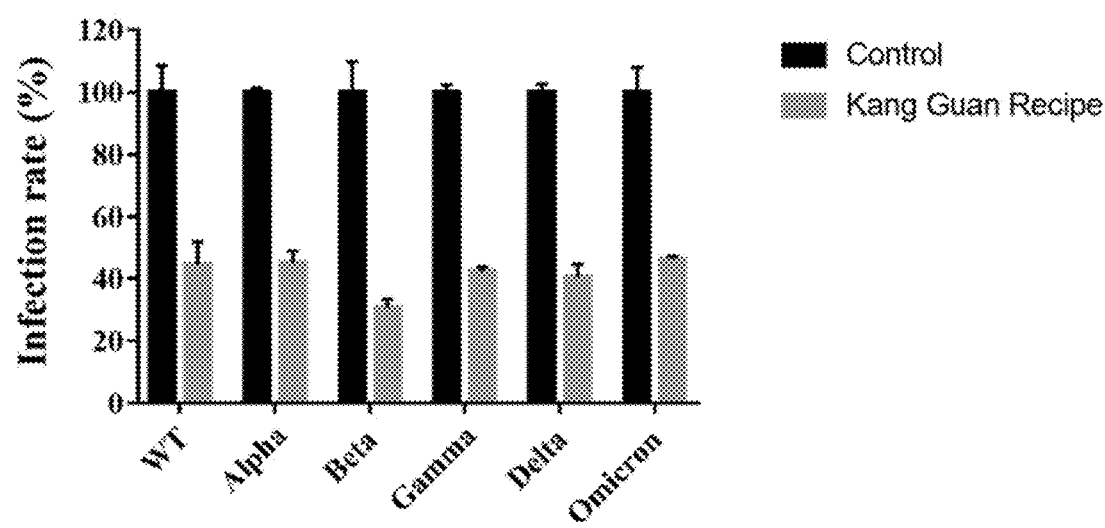
FIG. 11 illustrates Kang Guan Recipe inhibiting wild type and SARS-CoV-2 variants including Variant of Concerns (VOCs) viral infection in A549 lung cancer cells.

Example 11: Kang Guan Recipe Inhibiting Wild Type and SARS-CoV-2 Variants Including Variant of Concerns (VOCs) Viral Infection To screen the antiviral efficacy of herbal medicines, Kang Guan Recipe (3 mg/ml) was added to A549 lung cancer cells expressing human ACE2 and put them in the incubator for 1 h, and then wild type and its different variants, including Alpha, Beta, Gamma, Delta and Omicron (MOI~0.2) pseudoviral vectors were added to the cells and centrifuged for 1200×g for 30 min before returning to the incubator. After 24 hours, 100 μl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control group is set to 100%, and the values of the remaining group are compared to the value of the control group. FIG. 11 showed that Kang Guan Recipe suppress infection with all VOCs.

Figure 12:
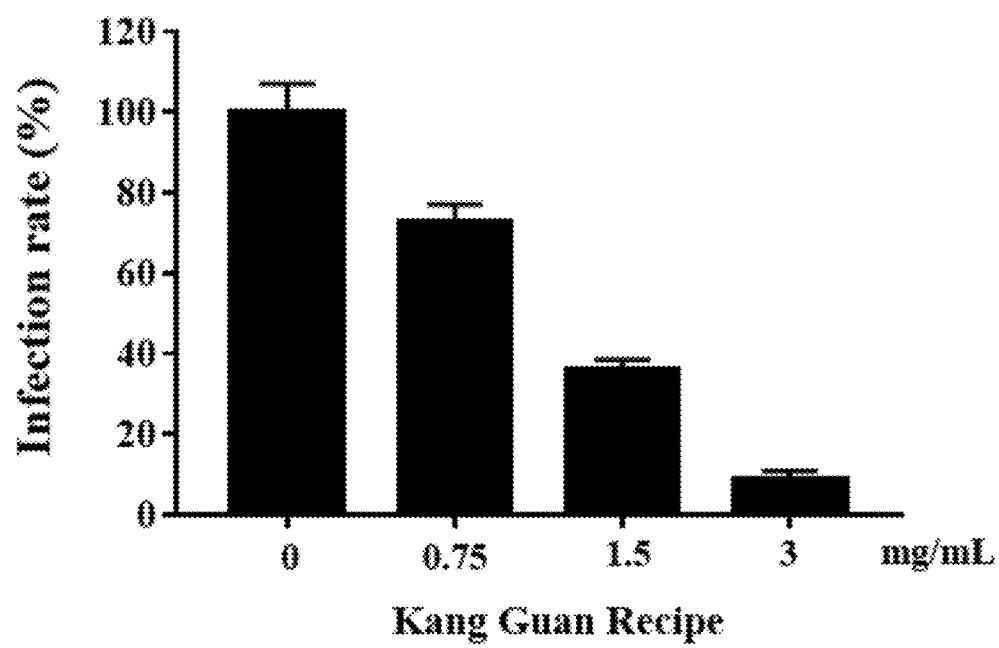
FIG. 12 illustrates Kang Guan Recipe dose dependently inhibiting Omicron variant of SARS-CoV-2 viral infection.

Example 12: Kang Guan Recipe Inhibiting Omicron Variant of SARS-CoV-2 Viral Infection in Dose-Dependent Manner To screen herbal medicines for antiviral effects, Kang Guan Recipe (0.75-3 mg/ml) was added to 293T cells expressing human ACE2 and put them into the incubator for 1 h, after which the virus Omicron variant (MOI~0.2) pseudoviral vector was added to the cells and centrifuged at 1200×g for 30 min before returning to the incubator. After 24 hours, 100 μl of cold light reagent (Bright-glo Luciferase Assay System, Promega, USA) was added to each group, after which the cold light was detected by ELISA plate Detect. Cell survival was determined by the Cell Counting Kit-8 (CCK-8) assay. The lower the activity value, the better the ability to inhibit viral infection. In this experiment, the value of the control group is set to 100%, and the values of the remaining group are compared to the value of the control group. In FIG. 12, it could be found that Knag Guan Recipe significantly inhibits the infection of the Omicron variant with the increase of concentration.

Figure 13:
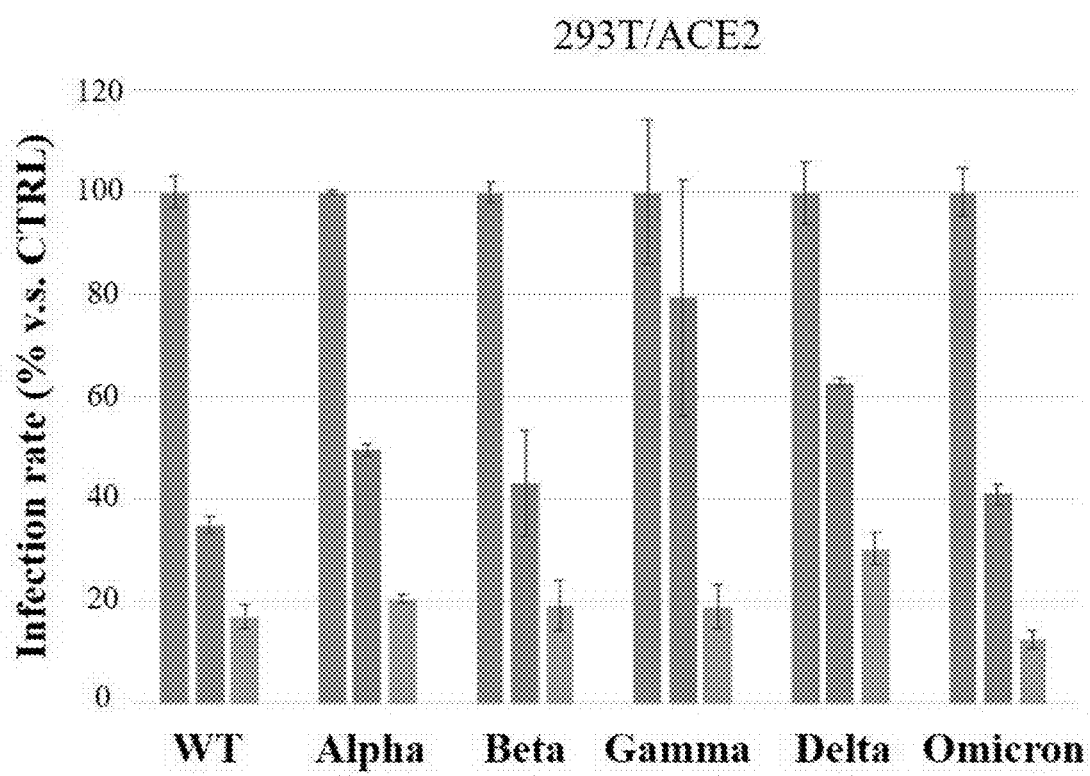
FIG. 13 illustrates Kang Guan Recipe inhibiting wild type and SARS-CoV-2 variants including Variant of Concerns (VOCs) viral infection.

Example 13: Kang Guan Recipe Inhibiting Wild Type and SARS-CoV-2 Variants Including Variant of Concerns (VOCs) Viral Infection To screen the antiviral effect of herbal medicines, different concentrations of Kang Guan Recipe (0, 1.5 and 3 mg/ml from left to right for each variant concern, respectively) were added to 293T expressing human ACE2 The cells and placed them in the incubator for 1 h, after which wild type and its different variants, Alpha, Beta, Gamma, Delta and Omicron's (MOI~0.2) pseudoviral vector were added to the cells and centrifuged at 1200×g for 30 min before returning to the incubator. After 24 hours, 100 μl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control group is set to 100%, and the values of the remaining groups are compared to the value of the control group. The results of FIG. 13 showed that Kang Guan Recipe has the best inhibition ability among Omicron VOC variants.

Example 14: Kang Guan Recipe Having No Cell Toxicity

Figure 14:
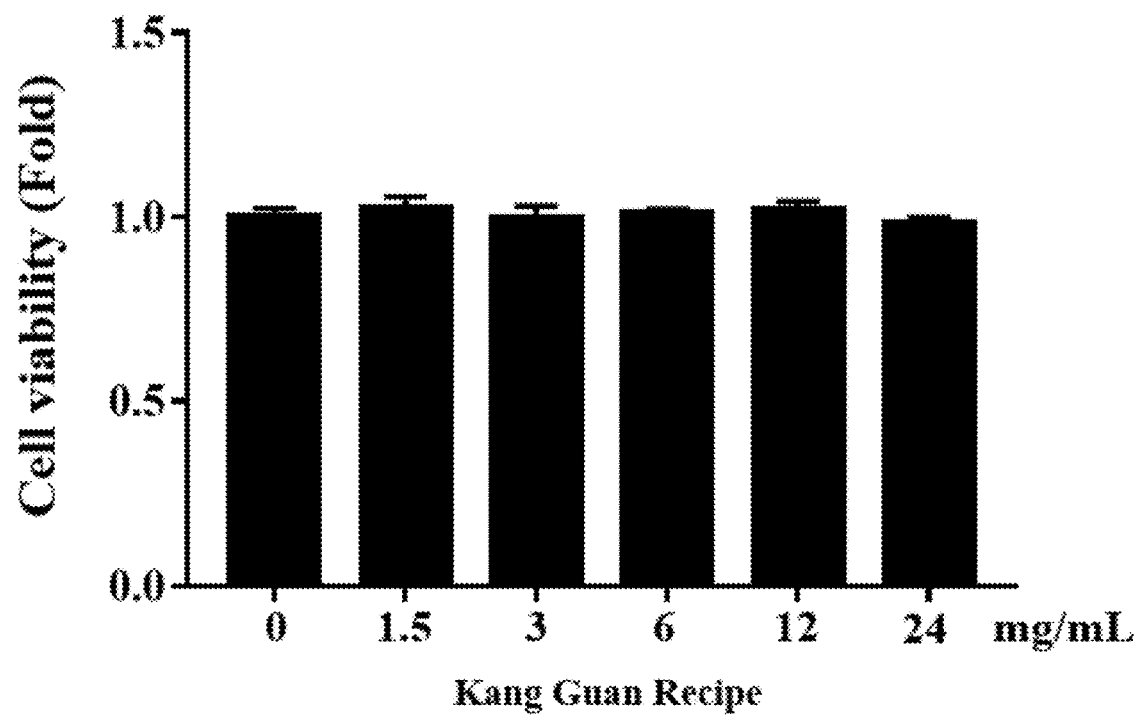
FIG. 14 illustrates Kang Guan Recipe without no cell toxicity.

Cytotoxicity test was performed by adding CCK-8 (Abcam) reagent to cells and the cells were left in the incubator for 4 hours. then, the cells were detected by using 595 nm light source and ELISA plate reader. The percentage of viable and dead cells in each treatment group was calculated by normalization with data of the untreated control group. FIG. 14 showed that Kang Guan Recipe does not have significantly cytotoxic.

Example 15: Kang Guan Recipe Having Better Inhibition Efficacy for Omicron Compare Wild Type SARS-CoV-2

Figure 15:
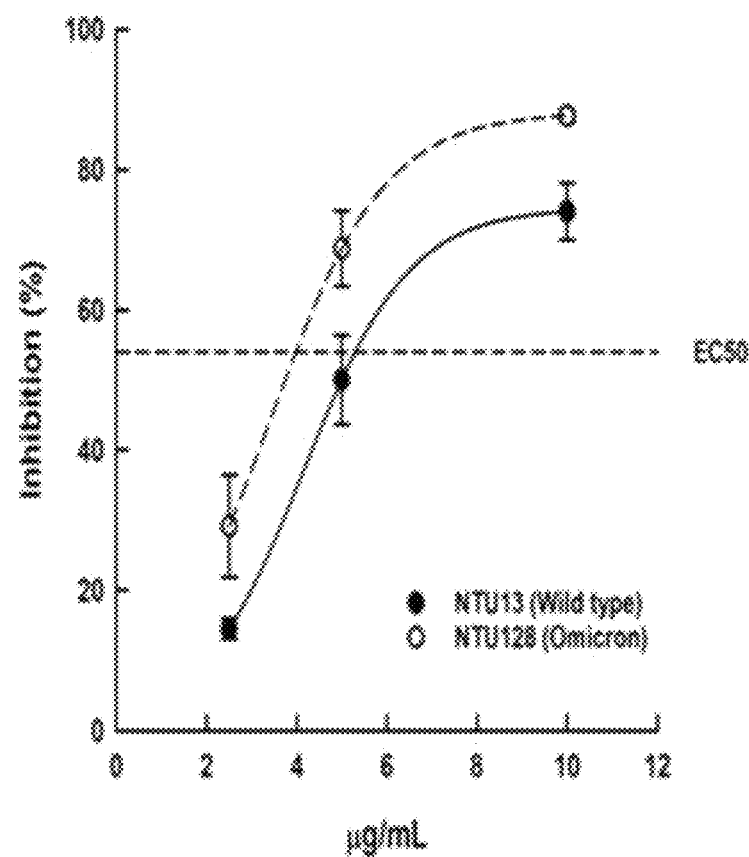
FIG. 15 illustrates Kang Guan Recipe has better inhibition efficacy for Omicron compare wild type SARS-CoV-2 infection by qPCR examination under Biosafety Level-3 Laboratory of the First Core Laboratory In Taiwan University.

To screen herbal medicines for anti-viral effects, different concentrations of Kang Guan Recipe (2.5, 5 and 10 mg/ml) and SARS-CoV-2 wild type and Omicron (MOI⁻0.02) were added to VeroE6. The cells were placed in the incubator for 1 h, after which the cells were washed 3 times and different concentrations of Kang Guan Recipe (2.5, 5 and 10 mg/ml) to the cells. After 24 hours, cellular RNA was extracted using the NucleoSpin RNA Kit (Macherey-Nagel GmbH & Co. KG, Germany) and real-time PCR was analyzed and the iTaq Universal Probes One-Step RT-PCR Kit (Bio-Rad, USA) and Qu-antStudio™ 5 Real-Time PCR System (Applied Biosystems™, USA) was applied to test for the SARS-CoV-2 E gene. All SARS-CoV-2 virus experiments were conducted at the Biosafety Level-3 Laboratory of the First Core Laboratory at Meical College of National Taiwan University. The results of FIG. 15 and Table 2 showed that the percentage of inhibition also increases significantly with the increase of concentration of Kang Guan Recipe (KG Recipe).

TABLE 2

Test result of $EC_{50}$ of KG Recipe

| KG Recipe | Wild type | Omicron |
|---|---|---|
| $EC_{50}$ | 5.06 ± 0.444 | 3.74 ± 0.390 |

Figure 16:
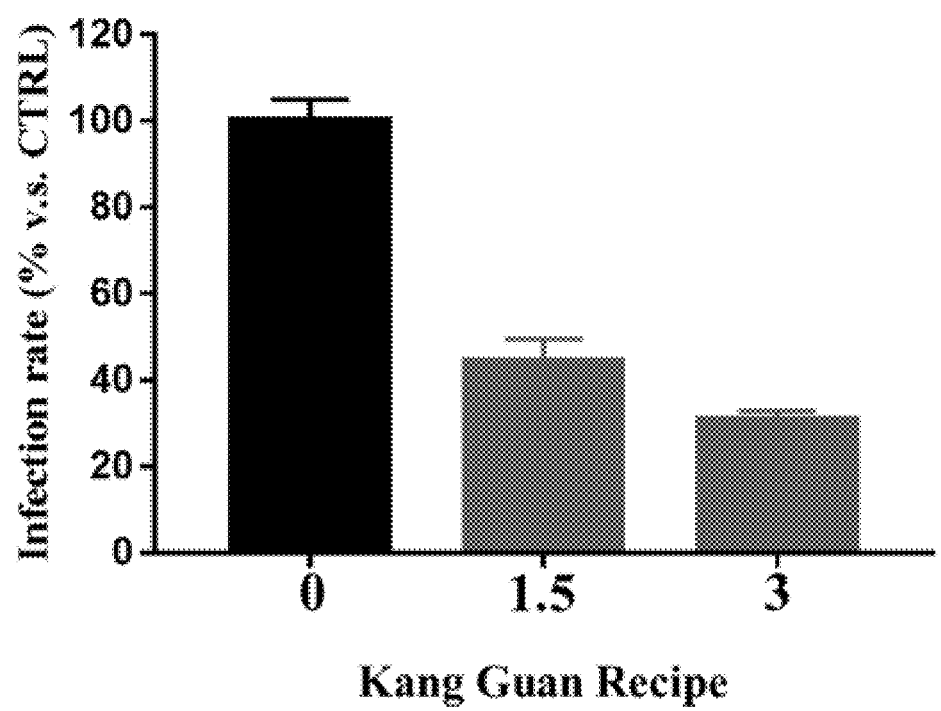
FIG. 16 illustrates Kang Guan Recipe having the ability to inhibit Omicron variant BA.4/BA.5 Of SARS-CoV-2 viral infection.

Example 16: Kang Guan Recipe Having the Ability to Inhibit BA.4/BA.5 of SARS-CoV-2 Viral Infection To screen herbal medicines for antiviral infection, Kang Guan Recipe (0.75-3 mg/ml) was added to 293T cells expressing human ACE2 and placed them in the incubator for 1 h, and then the Omicron variant BA.4/BA.5 (MOI⁻0.2) pseudoviral vector was added to the cells and centrifuged at 1200×g for 30 min before returning to the incubator. After 24 hours, 100 µl of cold light reagent (Bright-glo Luciferase Assay System, Promega, USA) was added to each group, after which the cold light was detected by ELISA plate. Cell survival was determined by the Cell Counting Kit-8 (CCK-8) assay. The lower the activity value, the better the ability to inhibit viral infection. In this experiment, the value of the control value is set to 100%, and the values of the remaining group are compared to the value of the control group. In FIG. 16, it could be found that Kang Guan Recipe significantly inhibits the infection of BA.4/BA.5 VOC along with the increase of concentration of the Kang Guan Recipe.

While the invention has been described and exemplified in sufficient details for those skilled in this art to make and use it, various alternatives, modifications, and improvements should be apparent without departing from the spirit and scope of this invention.

One skilled in the art readily appreciates that the present invention is well adapted to carry out the objects and obtain the ends and advantages mentioned, as well as those inherent therein. The processes and methods for producing them are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

What is claimed is:

1. A herbal composition for treating or preventing severe acute respiratory syndrome coronavirus 2 (SARS-CoV-2), which is consisting of:
    12-18 parts by weight of extract of *Astragalus membranaceus*;
    12-18 parts by weight of extract of *Atractylodes macrocephala*;
    12-18 parts by weight of extract of *Saposhnikovia divaricata*;
    6-12 parts by weight of extract of *Atractylodes lancea*;
    12-18 parts by weight of extract of *Pogostemon cablin*;
    12-18 parts by weight of extract of *Glehnia littoralis*;
    12-18 parts by weight of extract of *Lonicera japonica*; and
    6-12 parts by weight of extract of *Cyrtomium fortune*,
    wherein the herbal composition is in a form of a gel, an ointment, a cream, a film coating agent, a lotion, an aerosol, a plaster, a tablet, a pill, a capsule, or a dropping pill.

2. The herbal composition according to claim 1, which is consisting of:
    15 parts by weight of extract of *Astragalus membranaceus*;
    15 parts by weight of extract of *Atractylodes macrocephala*;
    15 parts by weight of extract of *Saposhnikovia divaricata*;
    9 parts by weight of extract of *Atractylodes lancea*;
    15 parts by weight of extract of *Pogostemon cablin*;
    15 parts by weight of extract of *Glehnia littoralis*;
    15 parts by weight of extract of *Lonicera japonica*; and
    9 parts by weight of extract of *Cyrtomium fortunei*.

3. A method of treating or preventing severe acute respiratory syndrome coronavirus 2 (SARS-CoV-2) of a subject in need thereof, consisting of administering an effective amount of the herbal composition of claim 1 to the subject.

4. A method of treating or preventing severe acute respiratory syndrome coronavirus 2 (SARS-CoV-2) according to claim 3, wherein the SARS-CoV-2 comprise the wild type and different variants.

5. The method according to claim 4, wherein the variants are the Alpha, Beta, Gamma, Delta and Omicron strain.

6. The method according to claim 4, wherein the different variant is the B.1.1.7 British variant strain, the 501Y.V2

South African variant strain, the B.1.618 India variant strain, the B.1.617.2 India Delta variant strain or Omicron variant BA.1/BA.2/BA.4/BA.5.

7. A herbal composition for treating or preventing severe acute respiratory syndrome coronavirus 2 (SARS-CoV-2), which is consisting of:
- 15-25 parts by weight of extract of *Astragalus membranaceus*;
- 15-25 parts by weight of extract of *Atractylodes macrocephala*;
- 15-25 parts by weight of extract of *Saposhnikovia divaricata*;
- 9-15 parts by weight of extract of *Atractylodes lancea*;
- 15-25 parts by weight of extract of *Pogostemon cablin*;
- 15-25 parts by weight of extract of *Glehnia littoralis*;
- 15-25 parts by weight of extract of *Lonicera japonica*;
- 9-15 parts by weight of extract of *Cyrtomium fortunei*; and
- 30-60 parts by weight of extract of *Platycodon grandiflorum*,
wherein the herbal composition is in a form of a gel, an ointment, a cream, a film coating agent, a lotion, an aerosol, a plaster, a tablet, a pill, a capsule, or a dropping pill.

8. The herbal composition according to claim 7, which is consisting of:
- 20 parts by weight of extract of *Astragalus membranaceus*;
- 20 parts by weight of extract of *Atractylodes macrocephala*;
- 20 parts by weight of extract of *Saposhnikovia divaricata*;
- 12 parts by weight of extract of *Atractylodes lancea*;
- 20 parts by weight of extract of *Pogostemon cablin*;
- 20 parts by weight of extract of *Glehnia littoralis*;
- 20 parts by weight of extract of *Lonicera japonica*;
- 12 parts by weight of extract of *Cyrtomium fortunei*; and
- 45 parts by weight of extract of *Platycodon grandiflorum*.

9. A method of treating or preventing severe acute respiratory syndrome coronavirus 2 (SARS-CoV-2) of a subject in need thereof, consisting of administering an effective amount of the composition of claim 7 to the subject.

10. The method of treating or preventing severe acute respiratory syndrome coronavirus 2 (SARS-CoV-2) according to claim 9, wherein the SARS-CoV-2 comprise the wild type and different variants.

11. The method according to claim 10, wherein the variants are the Alpha, Beta, Gamma, Delta and Omicron strain.

12. The method according to claim 10, wherein the different variant is the B.1.1.7 British variant strain, the 501Y.V2 South African variant strain, the B.1.618 India variant strain, the B.1.617.2 India Delta variant strain or Omicron variant BA.1/BA.2/BA.4/BA.5.

* * * * *